US012570786B2

(12) United States Patent
Kramer et al.

(10) Patent No.: US 12,570,786 B2
(45) Date of Patent: Mar. 10, 2026

(54) RIGID POLYURETHANE FOAM MADE WITH A HYDROCARBON BLOWING AGENT AND 1,1,1,4,4,4-HEXAFLUOROBUT-2-ENE

(71) Applicant: Dow Global Technologies LLC, Midland, MI (US)

(72) Inventors: Hans Kramer, Kempraten-Jona (CH); Thomas Mosciatti, Correggio (IT)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 1044 days.

(21) Appl. No.: 17/639,666

(22) PCT Filed: Aug. 14, 2020

(86) PCT No.: PCT/US2020/046288
§ 371 (c)(1),
(2) Date: Mar. 2, 2022

(87) PCT Pub. No.: WO2021/045887
PCT Pub. Date: Mar. 11, 2021

(65) Prior Publication Data
US 2022/0289894 A1     Sep. 15, 2022

(51) Int. Cl.
| | |
|---|---|
| *B29C 44/12* | (2006.01) |
| *B29C 44/18* | (2006.01) |
| *B29C 44/42* | (2006.01) |
| *B29K 75/00* | (2006.01) |
| *C08G 18/08* | (2006.01) |
| *C08G 18/32* | (2006.01) |
| *C08G 18/48* | (2006.01) |
| *C08G 18/50* | (2006.01) |
| *C08G 18/66* | (2006.01) |
| *C08G 18/76* | (2006.01) |
| *C08J 9/14* | (2006.01) |
| *C08G 101/00* | (2006.01) |

(52) U.S. Cl.
CPC ......... *C08G 18/3206* (2013.01); *C08G 18/14* (2013.01); *C08G 18/6611* (2013.01); *C08J 9/141* (2013.01); *C08J 9/146* (2013.01); *C08G 2101/00* (2013.01); *C08J 2203/142* (2013.01); *C08J 2203/162* (2013.01); *C08J 2203/182* (2013.01); *C08J 2205/10* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 2008/0255262 A1* | 10/2008 | De Vos .................. | B29C 44/38 521/155 |
| 2014/0357747 A1 | 12/2014 | Loh et al. | |
| 2016/0200889 A1* | 7/2016 | Parenti .................. | C08G 18/14 521/131 |
| 2017/0355893 A1* | 12/2017 | Ling ...................... | C11D 7/264 |
| 2018/0134861 A1* | 5/2018 | Schilling .............. | C08G 18/482 |
| 2018/0264303 A1* | 9/2018 | Robin ................ | B01D 11/0288 |
| 2019/0085145 A1* | 3/2019 | Yu ............................ | C08J 9/146 |

FOREIGN PATENT DOCUMENTS

| | | | | |
|---|---|---|---|---|
| AU | 2016-200022 A | 1/2016 | | |
| CN | 107266699 A | 10/2017 | | |
| CN | 109795184 A | 5/2019 | | |
| WO | WO-2007058793 A1 * | 5/2007 | ............. | B29C 44/38 |
| WO | 2010/046361 A | 4/2010 | | |
| WO | 2019/096763 A | 5/2019 | | |

* cited by examiner

*Primary Examiner* — Melissa A Rioja

(74) *Attorney, Agent, or Firm* — Warner Norcross + Judd LLP

(57)     ABSTRACT

Polyurethane thermal insulating foam is made in the presence of a small amount of cis- and/or trans-1,1,1,4,4,4-hexafluorobut-2-ene and a hydrocarbon blowing agent. Very low lambda values are obtained.

6 Claims, No Drawings

RIGID POLYURETHANE FOAM MADE WITH A HYDROCARBON BLOWING AGENT AND 1,1,1,4,4,4-HEXAFLUOROBUT-2-ENE

This invention relates to methods of making rigid polyurethane foams.

Rigid polyurethane foams are in widespread use as insulating foams for appliances such as refrigerators and freezers, as well as for other uses. The thermal insulation properties of the foam insulation are very important to the overall performance of the appliance. Better thermal insulation reduces energy consumption and lowers operating costs. For this reason, there is a constant demand for polyurethane foams that have lower lambda ($\lambda$) values, i.e., perform even better as thermal insulation.

Much work has been done over the past few decades to achieve this result and it is now believed that the insulating capacity of polyurethane foams is approaching a technological limit. Therefore, even small improvements are becoming difficult to realize. Due to the strong demand, however, additional improvements in insulating capacity are welcomed in the market, even if those improvements are small.

Currently, the rigid polyurethane foams in commercial use that have the best insulating capacity are made from foam formulations that contain large proportions of an o-toluene diamine-initiated polyether polyol. The use of this polyol, especially in conjunction with a vacuum-assisted process such as described, for example, in WO 2010/046361, has in commercial appliance production settings successfully produced polyurethane foams having very low lambda values. However, the o-toluene diamine-initiated polyol is expensive so it is desired to limit the amount that is used in the foam formulation. Equipment needed to perform the vacuum-assisting method may not be available at all manufacturing locations.

Certain hydrofluoroolefin (HFO) and hydrochlorofluoroolefin (HCFO) compounds have been associated with low lambda values when used as blowing agents in making rigid polyurethane foam. However, these compounds, like o-toluene diamine-initiated polyols, are relatively expensive and their use as blowing agents adds significant cost. A particular HFO, 1,1,1,4,4,4-hexafluorobut-2-ene (HFO-1336mzz), has been used in conjunction with cyclopentane and other blowing agents to make rigid polyurethane foam. See, for example, AU2016-200022A and WO 2019/096763. WO 2019/096763 describes polyurethane foam systems that contain 4 to 20 parts of HFO-1336mzz and 2 to 10 parts of cyclopentane (based on polyol weight). Those foam systems are used to make composite panels, such as composite panels for reefer/trailers. Foams made by this process are reported to have core densities of around 45-50 kg/m$^3$ and lambda values of 20 mW/m-K or more at an average plate temperature of 25° C. HFO-1336mzz by itself is said to cause the foams to be unduly brittle.

The invention is in one aspect a polyurethane foam that is a reaction product of a reaction system comprising a) at least one polyisocyanate;

b) at least one polyol;

c) at least one urethane catalyst;

d) at least one foam-stabilizing surfactant;

e) 0 to 3 weight-percent water, based on the combined weights of components b), c), d) and e);

f) 1 to 6 parts by weight, per 100 parts by weight of components b), c), d) and e), of cis- and/or trans-1,1,1,4,4,4-tetrafluorobut-2-ene; and g) 8 to 30 parts by weight, per 100 parts by weight of components b), c), d) and e), of one or more hydrocarbons having 4 to 6 carbon atoms.

The invention is also a method of making a polyurethane foam, comprising forming a reaction system as described with respect to the first aspect and curing the reaction system to produce the polyurethane foam.

The invention is also a method of manufacturing a thermally insulated cabinet, comprising A) positioning an outer shell member and an inner liner member so as to define a cavity therebetween;

B) introducing the reaction system of the first aspect into the cavity; and

C) curing the reaction system such that it expands and reacts to produce a polyurethane foam that fills the cavity and adheres to the outer shell member and to the inner liner member.

Foam made in accordance with the invention is characterized in having surprisingly good insulating properties, i.e., low lambda values. Lambda values are often reduced by 2 to 5% or more compared to an otherwise like foam that is prepared using only the hydrocarbon blowing agent. The lambda values obtained with this invention are nearly as good as those obtained when the 1,1,1,4,4,4-hexafluorobut-2-ene is used in larger quantities as the sole physical blowing agent. The latter result is particularly surprising and beneficial, as the invention permits most of the expensive 1,1,1,4,4,4-hexafluorobut-2-ene to be replaced with inexpensive hydrocarbon blowing agents, which reduces material costs.

Another advantage of the invention is that excellent lambda values are obtained even when the polyol component contains only a small amount of an o-toluene diamine-initiated polyol. This benefit allows much of the o-toluene diamine-initiated polyol to be replaced with a less expensive polyol, again reducing raw material costs while providing excellent thermal insulation properties.

Component a) is at least one organic polyisocyanate, examples of which include aliphatic, cycloaliphatic, araliphatic or aromatic polyisocyanates or combinations of any two or more thereof. The organic polyisocyanate may have, for example, isocyanate equivalent weights of up to 250. Specific organic polyisocyanates include, for example, alkylene diisocyanates, particularly those having from 4 to 12 carbon atoms in the alkylene moiety, such as 1,12-dodecane diisocyanate, 2-ethyltetramethylene 1,4-diisocyanate, 2-methyl-pentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates such as cyclohexane-1,3- and -1,4-diisocyanate and any mixture of these isomers, 1-isocyanato-3,3,5-trimethyl-5-isocyanato-methylcyclohexane (isophorone diisocyanate), 2,4- and 2,6-hexahydrotoluene diisocyanate and the mixtures of these isomer, 4,4'-, 2,2'- and 2,4'-dicyclohexylmethane diisocyanate and mixtures of these isomers, araliphatic diisocyanates such as 1,4-xylylene diisocyanate and mixtures of xylylene diisocyanate isomers, and preferably aromatic diisocyanates and polyisocyanates, such as 2,4- and 2,6-toluene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenylpolymethylene polyisocyanates (crude MDI), and mixtures of crude MDI and toluene diisocyanates.

Modified polyisocyanates, i.e., products which are obtained by chemical reaction of organic diisocyanates and/or polyisocyanates, may also be used. Specific examples are ester-, urea-, biuret-, allophanate-, uretoneimine-, carbodiimide-, isocyanurate-, uretdione- and/or urethane-containing diisocyanates and/or polyisocyanates, that contain from 33.6 to 15 percent by weight, preferably from 31 to 21 percent by weight, of isocyanate groups, based on the total weight of the modified polyisocyanate.

Component b) is at least one polyol. A wide range of polyols can be used, depending in part on the desired properties of the polymer foam. Useful polyols therefore include polyether polyols, polyester polyols, hydroxyl-terminated polybutadiene rubbers and polyacrylate polyols, as well as other types. Useful polyols have hydroxyl equivalent weights of about 30 to 3000; however it is preferred that at least one polyol has a hydroxyl equivalent weight of 30 to 1000, especially 75 to 560 or 100 to 350. The polyol(s) may have hydroxyl functionalities of 2 to 8 or more hydroxyl groups per molecule.

Component b) preferably includes at least one polyether polyol having a hydroxyl equivalent weight of 75 to 560, especially 100 to 350 and a nominal hydroxyl functionality of at least 3, such as 3 to 8. Examples of such polyether polyols include ethoxylates and/or propoxylates of one or more hydroxyl- and/or amine group containing starters that have an equivalent weight of 30 to 59, including, for example, one or more of ethylene glycol, diethylene glycol, triethylene glycol, 1,2-propane diol, 1,3-propanediol, dipropylene glycol, tripropylene glycol, glycerin, trimethylolpropane, trimethylolethane, neopentyl glycol, 1,6-hexanediol, 1,4-cyclohexanedimethanol, 1,2,6-hexanetriol, monoethanolamine, diethanolamine, triethanolamine, pentaerythritol, erythritol, sorbitol, sucrose, mannitol, o-toluene diamine (toluene-2,3-diamine and/or toluene-3,4-diamine), 2,4-, 2,5- and/or 2,6-toluene diamine, N,N,N',N'-tetrakis(2-hydroxypropyl)-ethylenediamine, diethyl toluenediamine, dimethylthiotoluenediamine and combinations thereof.

In some embodiments of the invention, component b) contains an alkoxylated o-toluene diamine polyol in an amount no greater than 65%, no greater than 50%, no greater than 40%, no greater than 35%, no greater than 30% or no greater than 25% of the combined weights of components b), c), d) and e). Such an alkoxylated o-toluene diamine polyol may have a hydroxyl equivalent weight of 75 to 560 or 100 to 350. The alkoxylated o-toluene diamine polyol may be absent or when present may constitute at least 5%, at least 10% or at least 15% of the combined weights of components b), c), d) and e). A significant advantage of this invention is that very low lambda values can be obtained even when an alkoxylated o-toluene diamine polyol is absent or present in only small quantities.

Another useful polyol is a polyether polyol having a hydroxyl equivalent weight of 75 to 560, especially 100 to 350, and a nominal hydroxyl functionality of 6 to 8. An example of such a polyol is an alkoxylated sorbitol or alkoxylated sucrose polyol. Such a polyol, when present, may for example constitute at least 5%, at least 10% or at least 25% and up to 80% or up to 60% of the combined weights of components b), c), d) and e).

Another useful polyol is a polyether having a nominal hydroxyl functionality of 2-4 and a hydroxyl equivalent weight of 75 to 560, which is not an alkoxylate of o-toluene diamine. Examples of such a polyether polyol include alkoxylates of one or more low molecular weight hydroxyl-containing compounds such as ethylene glycol, diethylene glycol, triethylene glycol, propylene glycol, dipropylene glycol, tripropylene glycol, glycerin, trimethylolpropane, trimethylolethane, erythritol, pentaerythritol, triethanolamine, triisopropanolamine and the like, alkoxylates of one or more amines such as 2,4-toluene diamine, 2,5-toluene diamine, bis(aminoethyl)amine, ethylene diamine and the like and alkoxylates of alkanolamines such as monoethanol amine, diethanolamine, monoisopropanolamine, diisopropanolamine, aminoethylethanolamine and the like.

In any of the foregoing polyols that are alkoxylates, the alkoxide may be, for example, one or more of 1,2-propylene oxide, 1,3-propylene oxide, ethylene oxide, 1,2- or 2,3-butylene oxide, tetrahydrofuran, styrene oxide or cyclohexane oxide. Propoxylates and/or ethoxylates are particularly preferred. Such alkoxylates preferably are not halogenated.

Still another useful polyol has a nominal hydroxyl functionality of 2 to 8, especially 2 to 6 or 3 to 4, having a hydroxyl equivalent weight of 30 to 74, such as ethylene glycol, diethylene glycol, triethylene glycol, propylene glycol, dipropylene glycol, tripropylene glycol, glycerin, trimethylolpropane, trimethylolethane, erythritol, pentaerythritol, sorbitol and sucrose.

Still other useful polyols are polyester polyols. Useful polyester polyols may be reaction products of, for example, an organic dicarboxylic acid (or corresponding acid anhydride or ester) having about 2 to about 12 carbon atoms, preferably an aromatic dicarboxylic acid having 8 to 12 carbon atoms, with a polyhydric alcohol, preferably a diol and/or triol having 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably orthophthalic acid, isophthalic acid, terephthalic acid and the isomeric naphthalenedicarboxylic acids. The dicarboxylic acids may be used either individually or mixed with one another. Examples of dihydric and polyhydric alcohols used to make the polyester polyol are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Also useful are modified aromatic polyester polyols such as described in U.S. Pat. No. 6,359,022, which contain one or more pendant aliphatic hydrocarbyl groups that have 6 or more carbon atoms in a straight or branched chain. Furthermore, polyester polyols made from lactones such as ε-caprolactone or hydroxycarboxylic acids such as ω-hydroxycaproic acid and hydrobenzoic acid may also be employed. Hybrid polyether-polyester polyols such as are described, for example, in WO 2011/137011 are also useful.

Another useful polyol is a polyester or polyether polyol having a hydroxyl equivalent weight in excess of 560.

Component c) is a urethane catalyst, i.e., a material that catalyzes the reaction of an alcohol group or water with an isocyanate group. Among suitable urethane catalysts are tin (II) and tin (IV) catalysts, catalysts that contain other Group III to Group XV metals, tertiary amine compounds, amidines, tertiary phosphines, and the like. Among the useful urethane catalysts are, for example, trimethylamine, triethylamine, N-methylmorpholine, N-ethylmorpholine, N,N-dimethylbenzylamine, N, N-dimethylethanolamine, dialkylimidazole compounds, 2,2'-dimorpholinodiethylether, N,N,N',N'-tetramethyl-1,4-butanediamine, N, N-dimethylpiperazine, 1,4-diazobicyclo-2,2,2-octane, tetraalkyl guanidine compounds, 2,2,2-dimethylaminoethoxyethyl methylaminoethanol, N, N-dimethylcyclohexylamine, 1,3,5-tris [3-(dimethylamino)propyl]hexahydro-1,3,5-triazine, triethylenediamine, dimethylalkylamines where the alkyl group contains from 4 to 18 carbon atoms, pentamethyldiethylene triamine, tetramethyl ethylene diamine, dibutyl tin dilaurate, dimethyltin dilaurate, stannous octoate, stannous oleate, stannic chloride, stannous chloride, di-n-butyl tin bis(mer-captoacetic acid isooctyl ester) and other organotin compounds of the formula $SnR_n(OR)_{4-n}$, wherein R is alkyl or aryl and n is 0-2, The urethane catalyst or catalysts are used in catalytically effective quantities. The urethane catalyst or catalysts may, for example, constitute up to 5%, or up to 4% of the combined weight of components b), c), d) and e).

Component d) is one or more foam-stabilizing surfactants. Suitable surfactants include, but are not limited to, silicones such as silicone oils and organosilicone-polyether copolymers, including polydimethyl siloxane and polydim-ethylsiloxane-polyoxyalkylene block copolymers such as are described in U.S. Pat. No. 4,483,894. Other suitable surfactants are linear siloxane-polyoxyalkylene bock copolymers having an average molecular weight of at least 30,000 such as are disclosed in U.S. Pat. No. 4,022,722. Still other suitable surfactants include organic surfactants such as nonylphenol ethoxylates and ethylene oxide/butylene oxide block co-polymers. Suitable surfactants are widely commercially available from Evonik Industries, Momentive Performance Materials and The Dow Chemical Company.

Component d) may constitute, for example, at least 0.25% and up to 10% of the total weight of components b), c), d) and e). A preferred amount is at least 0.5% or at least 1%, and up to 5% or up to 3%, on the same basis.

Component f) is the cis- or trans-isomer of 1,1,1,4,4,4-tetrafluorobut-2-ene, or a mixture of the cis- and trans-isomers in any proportion. Component f) is present in an amount of 1 to 6 parts by weight per 100 parts by weight of components b), c), d) and e). A preferred amount is 1 to 4 parts by weight or 2 to 4 parts by weight, on the same basis.

Component g) is one or more hydrocarbons having 4 to 6 carbon atoms. Examples of such hydrocarbons include n-butane, isobutane, cyclobutane, n-pentane, isopentane, neopentane, cyclopentane, n-hexane, 2-methylpentane, 3-meth-ylpentane, cyclohexane, 2-ethylbutane, 2,2-dimethyl butane and 2,3-dimethylbutane, as well as mixtures of any two or more thereof. One or more pentanes are preferred and cyclopentane is especially preferred. Component g) is present in an amount of 8 to 30 parts by weight, preferably 10 to 20 parts by weight or 12 to 20 parts by weight, per 100 parts by weight of components b), c), d) and e).

The reaction system may include various optional ingredients, in addition to those mentioned already. Such optional ingredients may include an isocyanate trimerization catalyst. Examples of isocyanate trimerization catalysts include strong bases such as alkali metal phenolates, alkali metal alkoxides, alkali metal carboxylates, quaternary ammonium salts and the like. Another optional ingredient is one or more flame retardants, such as a phosphorus-containing flame retardant, a halogenated flame retardant and melamine. The reaction system may contain one or more fillers and/or reinforcing agents such as fiber glass, carbon fibers, flaked glass, mica, talc and calcium carbonate; one or more pigments and/or colorants such as titanium dioxide, iron oxide, chromium oxide, azo/diazo dyes, phthalocyanines, dioxazines and carbon black; one or more biocides; one or more preservatives; one or more antioxidants; and the like.

Foam is made in accordance with the invention by combining ingredients a)-g), together with any optional ingredients, to produce a reaction system which is then cured under conditions such that component g) volatilizes and the polyisocyanate reacts with the polyol(s), water and other isocyanate-reactive ingredients to produce the polymeric foam. The cis- and/or trans-1,1,1,4,4,4-hexafluorobut-2-ene may also volatilize during the foaming process. The isocyanate index (100 times the ratio of isocyanate groups to isocyanate-reactive groups provided to the reaction mixture) is at least 90, preferably at least 100 or at least 110. When a polyurethane-isocyanurate foam is desired, the isocyanate index preferably is at least 200, at least 250 or at least 300. In some embodiments, the isocyanate index may be up to 1000, up to 600, up to 500, or up to 450, up to 250, up to 200, up to 150 or up to 125.

The order of mixing components a)-g) is not especially critical, although it is generally preferable to combine the polyisocyanate with the water and polyol(s) when all of the other components are already present. Components b)-e), b)-f) or b)-g) may be combined first to form a formulated polyol component which is then combined with the remaining ingredients to produce the reaction system. In a particular embodiment, components b)-e) or b)-f) are combined to form a formulated polyol component, and the formulated polyol component is then mixed with components f) (if necessary), g) and a), either simultaneously or sequentially, to produce the reaction system. It is within the scope of the invention, however, to produce the reaction mixture by bringing the various components together all at once, or in various subcombinations.

The polyisocyanate, polyol(s) and water typically will react spontaneously when mixed, even at room temperature, and the exothermic heat of reaction is often sufficient to produce the temperature needed to volatilize the hydrocarbon blowing agent (component g)) and component f). Therefore, it is often necessary only to form the reaction mixture at or about room temperature, such as 10 to 35° C., and allow the reaction to complete without further applied heat. However, if desired, the components can be heated at the time of or prior to forming the reaction mixture, and/or the reaction system once formed can be heated to an elevated temperature to promote the curing reaction.

The foam can be produced in a free-rise process in which the foam formulation is dispensed into an open area and permitted to rise freely in the vertical direction to produce bunstock. In other embodiments, the foam is produced in a continuous process by continuously dispensing the reaction mixture onto a moving belt or substrate. The substrate may be a facing sheet or panel, and a second layer of a facing sheet or panel may be continuously laid on top of the reaction mixture to form a sandwich structure. The reaction mixture is cured to form a foam adherent to the substrate(s).

In embodiments of particular interest, the foam is produced by introducing the reaction mixture into a cavity or defined space where the expansion and curing takes place. The cavity or defined space may be, for example, defined by the walls of a thermal insulation panel or wall, such as the walls of a refrigerator, freezer, cooler, dishwasher, water heater or other appliance. The cavity or defined space may be an annular mold or cavity such as is used to make pre-insulated pipes. In particular, the cavity can be formed by positioning an outer shell member and an inner liner member so as to define a space therebetween. The outer shell layer may form, for example, the outer wall of an appliance for which thermal insulation is wanted. An inner liner may form, for example, an interior wall of such an appliance. The outer shell and inner liner each can be made of a metal such as steel or aluminum as well as various structural thermoplastic or thermoset resins such as polystyrene, high-impact polystyrene (HIPS), an acrylonitrile-butadiene-styrene interpolymer, a polyamide, a polyester, a rigid polyurethane resin, or the like. In a specific embodiment, the appliance is a refrigerator or freezer; the outer shell is a metal and the inner liner is a structural thermoplastic resin such as polystyrene, high-impact polystyrene (HIPS), an acrylonitrile-butadiene-styrene interpolymer, a polyamide, a polyester or a rigid polyurethane resin.

The outer shell and inner liner are positioned to form the cavity into which the reaction system is introduced, and in which it is cured to form the polyurethane foam. The shell and liner may be held in their respective positions using a jig or other mechanical apparatus.

The reaction system is introduced into the cavity, such as by pouring or injecting it through one or more injection ports. The amount of the reaction system introduced is at least sufficient that reaction system fills the cavity as it expands and cures. The cavity may be "overpacked" by introducing some excess of reaction mixture beyond that minimally required to fill the cavity once the reaction mixture has expanded. For example, the cavity may be overpacked by 5 to 40%, i.e., 5 to 40% by weight more of the reaction system is introduced beyond that minimally required to fill the cavity once the reaction mixture expands.

The reaction system, once introduced, expands and cures to produce a polyurethane foam in the cavity. The polyurethane foam typically adheres to both the outer shell and the inner liner and contributes mechanical strength and stability to the resulting assembly, as well as providing thermal insulation.

A subatmospheric pressure may be maintained in the cavity during the filling step and optionally at least part of the curing step, as described, for example, in WO 2007/058793 and WO 2010/044361. The reduced pressure may be, for example, 300 to 950 mbar (30-95 kPa) actual, preferably from 400 to 950 mbar (40-95 kPa) actual and even more preferably from 700 to 950 mbar (50-95 kPa) actual, before or immediately after the foam forming composition is charged to the mold. The reduced pressure preferably is maintained until the reaction system has been introduced into the mold, and more preferably until such time as the reaction system has expanded and gelled (i.e., formed a three-dimensional polymer network).

Foam made in accordance with the invention may have a foam density of, for example, 20 to 120 kg/m$^3$, 24 to 80 kg/m$^3$, 28 to 64 kg/m$^3$ or 28 to 40 kg/m$^3$, as measured according to ASTM 1622-88. The cells may be at least about 70 percent closed, at least about 80 percent closed or at least about 85 percent closed. The foam often has a lambda value, as measured according to EN-12667 at a 10° C. average plate temperature, of no greater than 20.0, no greater than 19.0, no greater than 18.5, or even no greater than 18.25 mW/m-° K.

The following examples are provided to illustrate the invention but not to limit the scope thereof. All parts and percentages are by weight unless otherwise indicated.

Formulated Polyol A is a mixture of polyether polyols, urethane catalysts, silicone surfactant and water. It contains 1.8% by weight water and 25% by weight of an o-TDA polyol having a functionality of 4 and a hydroxyl number of about 440 mg KOH/g. Formulated Polyol A has a hydroxyl number of 395 mg KOH/g.

Formulated Polyol B is a mixture of polyether polyols, urethane catalysts, silicone surfactant, glycerin and water. It contains 1.5% by weight water and 59% by weight of o-TDA polyols having a functionality of 4 and hydroxyl number of 370 to 440 mg KOH/g. Formulated Polyol B has a hydroxyl number of 418 mg KOH/g.

PMDI is a polymeric MDI that has an isocyanate content of about 31% by weight.

Example 1 and Comparative Sample A

To make Example 1, 100 parts by weight of Formulated Polyol A is combined at about 23° C. with 3 parts by weight trans-1,1,1,4,4,4-hexafluorobut-2-ene, 13.2 parts by weight cyclopentane and then with 140 parts of the PMDI (122 index) to form a reaction mixture. A portion of the reaction mixture is immediately injected into a rectangular "Brett" mold having dimensions of 200 cm×20 cm×5 cm (~6'6"× 8"×2"). The Brett mold is oriented with the 200 cm direction oriented vertically and preheated to 45±5° C. The Brett mold is at atmospheric pressure. The composition is permitted to expand against its own weight and cure inside the mold. The amount of polyurethane-forming composition is selected such that the resulting foam just fills the mold. The density of the resulting foam is then measured and reported as the minimum fill density (MFD). The foam is demolded and the experiment repeated, except that the mold is overpacked by 10%. The lambda value of the resulting foam is determined according to EN 12667 using an average plate temperature of 10° C.

Another portion of the reaction mixture is poured into a 20 cm×20 cm×20 cm box and evaluated visually for cream time. A spatula is pressed to the surface of the curing reaction mixture to evaluate for gel time (the time after mixing at which strings of polymer stick to the spatula) and tack-free time (the time after mixing at which the polymer no longer sticks to the spatula).

The foregoing experiments are repeated using the Example 1 formulation except that a partial vacuum (−0.2 atmosphere gauge, 80 kPa actual) is drawn on the Brett mold during filling and foam expansion until the reaction system has gelled.

Comparative Sample A is made in an analogous manner by combining 100 parts by weight of Formulated Polyol A with 14.5 parts of cyclopentane and 140 parts of the PMDI (1.22 index). Cream time, gel time and tack-free time are measured as before. Minimum fill density and lambda value are determined for foams made in the Brett mold at ambient pressure and the reduced pressure as described with regard to Example 1.

Results of the foregoing testing are as indicated in Table 1.

TABLE 1

| | Comp. Sample A | Example 1 |
|---|---|---|
| Trans-1,1,1,4,4,4-hexafluorobut-2-ene | 0 | 3 |
| Cyclopentane | 14.5 | 13.2 |
| Cream time, seconds | 3 | 4 |
| Gel time, seconds | 27 | 26 |
| Tack-free time, seconds | 34 | 31 |
| Atmospheric Pressure Brett Mold Results | | |
| MFD, g/L | 35.4 | 33.7 |
| Lambda, mW/m-° K | 18.9 | 18.3 |
| % Lambda Reduction | — | 3.2% |
| Vacuum-Assisted Brett Mold Results | | |
| MFD, g/L | 29.3 | 29.0 |
| Lambda, mW/m-° K | 18.9 | 18.3 |
| % Lambda Reduction | — | 3.1% |

As the data in Table 1 shows, a significant reduction in lambda is obtained by adding 3 parts by weight of 1,1,1,4, 4,4-hexafluorobut-2-ene to the formulation and reducing the amount of cyclopentane by about 10%. The lambda value obtained with Example 1 is very low, particularly considering that the foam formulations contain rather low proportions of o-TDA-initiated polyols. No significant change in cream, gel or tack-free times is seen.

Examples 2 and 3 and Comparative Sample B

Foam Examples 2 and 3 are made by combining 100 parts of Formulated Polyol B with 3 parts either trans- or cis-1, 1,1,4,4,4-hexafluorobut-2-ene, 14.8 parts of cyclopentane and PMDI (119 index) in the same general manner as described in the previous examples. Comparative Sample B is made by combining 100 parts of Formulated Polyol B with 16 parts cyclopentane and the PMDA (121 index) and foaming the resulting reaction mixture in an analogous way. Cream, gel and tack-free times are measured in each case, as are minimum fill density and lambda for foams produced in the Brett mold at each of ambient and reduced pressure. The results of the foam testing are as indicated in Table 2.

TABLE 2

| | Comp. Sample B | Ex. 2 | Ex. 3 |
|---|---|---|---|
| Cis-1,1,1,4,4,4-hexafluorobut-2-ene | 0 | 0 | 3 |
| Trans-1,1,1,4,4,4-hexafluorobut-2-ene | 0 | 3 | 0 |
| Cyclopentane | 16 | 14.8 | 14.8 |
| Cream time, seconds | 3 | 3 | 3 |
| Gel time, seconds | 21 | 21 | 20 |
| Tack-free time, seconds | 24 | 24 | 22 |
| Atmospheric Pressure Brett Mold Results | | | |
| MFD, g/L | 35.9 | 35.3 | 36.5 |
| Lambda, mW/m-° K | 18.65 | 18.1 | 18.1 |
| % Lambda Reduction | — | 3.1 | 2.9 |
| Vacuum-Assisted Brett Mold Results | | | |
| MFD, g/L | 30.9 | 30.5 | 31.05 |
| Lambda, mW/m-° K | 18.4 | 18.2 | 18.05 |
| % Lambda Reduction | — | 1.3 | 2.0 |

The data in Table 2 demonstrates that significant reductions in lambda value are achieved with the invention using either the cis- or trans-isomer of 1,1,1,4,4,4-hexafluorobut-2-ene. In this case, the improvements in insulation capacity are achieved even in a foam formulation that contains a large proportion of o-TDA-initiated polyols. Such foams are previously known to have very low lambda values; a further significant reduction is unexpected and quite beneficial.

Example 4 and Comparative Samples C and D

Comparative Sample C is prepared by combining 100 parts by weight of Formulated Polyol A with 14.5 parts of cyclopentane and PMDI (112 index) and processing the resulting reaction mixture into foam in the same general manner as described in the previous examples, using a reduced mold pressure and 10% overpacking. Comparative Sample D is prepared in like manner by combining 100 parts by weight of Formulated Polyol A with 6.6 parts of cyclopentane, 18 parts of cis-1,1,1,4,4,4-hexafluorobut-2-ene and PMDI (112 index).

Example 4 is made in the same general way, by combining 100 parts Formulated Polyol B, 3 parts of cis-1,1,1,4,4, 4-hexafluorobut-2-ene, 14.8 parts of cyclopentane and PMDI (112 index).

Lambda is measured. Foam densities are about 35 g/L in each case. The ingredients in each case and the results of the foam testing are as indicated in Table 3.

TABLE 3

| | Comp. Sample C | Comp. Sample D | Ex. 1 | Ex. 4 |
|---|---|---|---|---|
| Formulated Polyol A | 100 | 100 | 100 | 0 |
| Formulated Polyol B | 0 | 0 | 0 | 100 |
| Cis-1,1,1,4,4,4-hexafluorobut-2-ene | 0 | 18 | 0 | 3 |
| Trans-1,1,1,4,4,4-hexafluorobut-2-ene | 0 | 0 | 3 | 0 |
| Cyclopentane | 14.5 | 6.6 | 14.8 | 14.8 |
| Lambda, mW/m-° K | 18.9 | 17.8 | 18.3 | 18.1 |
| % Lambda Reduction | — | 5.8 | 3.1 | 4.2 |

As can be seen by comparing Comparative Samples C and D, a lambda reduction of 5.8% (relative to Comp. Sample C) is obtained by including 18 parts of cis-1,1,1,4,4-hexafluorobut-2-ene, and reducing the amount of cyclopentane to 6.6 parts. This result requires a large amount of the expensive 1,1,1,4,4,4-hexafluorobut-2-ene material, which results in a large cost disadvantage; 18 parts of cis-1,1,1,4,4,4-hexafluorobut-2-ene are needed to produce a 1.1 mW/m-° K reduction in lambda. Examples 1 and 4 show that, in two different polyol systems, over half to almost 75% of that benefit can be obtained with this invention, by instead adding only one-sixth (3 parts) of the amount of 1,1,1,4,4,4-hexafluorobut-2-ene. In Example 1, a reduction of 0.6 mW/m-° K is obtained using only 3 parts of 1,1,1,4,4,4-hexafluorobut-2-ene; in Example 4, a 0.8 mW/m-° K is obtained while using 3 parts of 1,1,1,4,4,4-hexafluorobut-2-ene. With this invention, most of the advantage of using the 1,1,1,4,4,4-hexafluorobut-2-ene is obtained at only a fraction of the usage level and only a fraction of the cost.

The invention claimed is:

1. A method of making a polyurethane foam, comprising forming a reaction system and curing the reaction system to produce the polyurethane foam, wherein the reaction system comprises:
   a) at least one polyisocyanate;
   b) at least one polyol;
   c) at least one urethane catalyst;
   d) at least one foam-stabilizing surfactant;
   e) 0 to 3 weight-percent water, based on the combined weights of components b), c), d) and e);
   f) 2 to 4 parts by weight, per 100 parts by weight of components b), c), d) and e), of 1,1,1,4,4,4-hexaflurobut-2-ene; and
   g) 12 to 20 parts by weight, per 100 parts by weight of components b), c), d) and e), of one or more hydrocarbons having 4 to 6 carbon atoms,
   wherein the reaction system contains from 5 weight percent to 25 weight percent of an alkoxylated o-toluene diamine polyol, based on the combined weights of components b), c), d) and e), and
   wherein the reaction system is introduced into a cavity and cured in the cavity, and a pressure of 700 to 950 millibars absolute is maintained in the cavity as the reaction system is introduced into the cavity.

2. A polyurethane foam made in the method of claim 1.

3. The foam of claim 2 which exhibits a lambda value of at most 18.5 mw/m-° K as measured according to EN 12667 at an average plate temperature of 10° C.

4. The foam of claim 2 which exhibits a lambda value of at most 18.25 mw/m-° K as measured according to EN 12667 at an average plate temperature of 10° C.

5. The foam of claim 2 which has a density of 28 to 40 kg/m³ as measured according to ASTM 1622-88.

6. A method of manufacturing a thermally insulated cabinet, comprising

A) positioning an outer shell member and an inner liner member so as to define a cavity therebetween;

B) introducing the reaction system into the cavity; and

C) curing the reaction system such that it expands and reacts to produce a polyurethane foam that fills the cavity and adheres to the outer shell member and to the inner liner member, wherein the reaction system comprises:

a) at least one polyisocyanate;

b) at least one polyol;

c) at least one urethane catalyst;

d) at least one foam-stabilizing surfactant;

e) 0 to 3 weight-percent water, based on the combined weights of components b), c), d) and e);

f) 2 to 4 parts by weight, per 100 parts by weight of components b), c), d) and e), of 1,1,1,4,4,4-hexaflurobut-2-ene; and g) 12 to 20 parts by weight, per 100 parts by weight of components b), c), d) and e), of one or more hydrocarbons having 4 to 6 carbon atoms, wherein the reaction system contains from 5 weight percent to 30 weight percent of an alkoxylated o-toluene diamine polyol, based on the combined weights of components b), c), d) and e), and a subatmospheric pressure of 700 to 950 millibars absolute is maintained in the cavity during at least step B).

\* \* \* \* \*